(12) United States Patent
Rhee et al.

(10) Patent No.: US 10,175,345 B2
(45) Date of Patent: *Jan. 8, 2019

(54) EVENT TRACKING IMAGER

(71) Applicant: Voxtel, inc., Beaverton, OR (US)

(72) Inventors: Jehyuk Rhee, King City, OR (US); Adam Lee, Portland, OR (US); George Williams, Portland, OR (US)

(73) Assignee: Voxtel, Inc., Beaverton, OR (US)

( * ) Notice: Subject to any disclaimer, the term of this patent is extended or adjusted under 35 U.S.C. 154(b) by 561 days.

This patent is subject to a terminal disclaimer.

(21) Appl. No.: 14/609,098

(22) Filed: Jan. 29, 2015

(65) Prior Publication Data

US 2018/0091747 A1    Mar. 29, 2018

Related U.S. Application Data

(63) Continuation-in-part of application No. 14/548,172, filed on Nov. 19, 2014, which is a continuation-in-part of application No. 14/526,340, filed on Oct. 28, 2014.

(60) Provisional application No. 62/065,508, filed on Oct. 17, 2014.

(51) Int. Cl.
*G01S 7/486* (2006.01)
*G01S 17/10* (2006.01)
*G01S 17/02* (2006.01)
*G01S 17/89* (2006.01)

(52) U.S. Cl.
CPC .......... *G01S 7/4865* (2013.01); *G01S 7/4863* (2013.01); *G01S 17/023* (2013.01); *G01S 17/10* (2013.01); *G01S 17/89* (2013.01)

(58) Field of Classification Search
CPC .... G01S 7/4865; G01S 7/4863; G01S 17/023; G01S 17/89; G01S 17/10
See application file for complete search history.

(56) References Cited

U.S. PATENT DOCUMENTS 8,581,168 B2   11/2013   Linder
9,591,238 B2 *  3/2017   Lee .................. H04N 5/3742
2012/0261553 A1  10/2012   Elkind

* cited by examiner

*Primary Examiner* — Twyler Haskins
*Assistant Examiner* — Angel L Garces-Rivera

(57) ABSTRACT

An imaging device is disclosed, the device comprising a pixelated array of semiconductor detector elements, in which each detecting element is electrically connected to an integrated circuit, the integrated circuit comprising a passive signal path and an active signal path. The active path provides consecutive frame imaging and the active path detects the location of transient events. The device further comprising a readout decoder block, the readout decoder block controlling operation of the passive paths. Additionally the device comprises of an address arbitration control block, the address arbitration control block controlling operation of the active paths, wherein the address arbitration control block readout of the active paths is independent of readout of the passive paths.

30 Claims, 6 Drawing Sheets

US 10,175,345 B2

EVENT TRACKING IMAGER

REFERENCE TO RELATED APPLICATIONS

This application is a continuation-in-part of U.S. application Ser. No. 14/548,172 filed Nov. 19, 2014 which claims benefit to U.S. application Ser. No. 14/526,340 filed Oct. 28, 2014 which claims benefit to U.S. Provisional Application No. 62/065,508 filed on Oct. 17, 2014 and U.S. Provisional Application No. 62/040,623.

STATEMENT OF GOVERNMENT INTEREST

This invention was made with government support under contract FA8650-12-C-1365 awarded by the Air Force Research Laboratory. The government has certain rights in the invention.

TECHNICAL FIELD OF THE DISCLOSURE

The present disclosure relates in general to imaging devices. The disclosure relates in particular to semiconductor imaging devices capable of both passive imaging and energetic event detection, such events as those created by small arms fire, explosive events, and other such forces releasing bursts of heat or photonic energy.

DISCUSSION OF BACKGROUND ART

Photosensitive semiconductor based optical imagers are commonplace. In a semiconductor based imager, an array of pixels each comprise of a photosensitive junction or photodetector. When a photon with sufficient energy is incident upon and absorbed in the structure an electron-hole pair is created. To read resultant current from absorbed photons an amplifier is required. In CMOS devices an active pixel sensor (APS) has an integrated circuit for each pixel in the sensor with the photosensitive junction and amplifier built within the same material. In ultraviolet and infrared devices a readout integrated circuit (ROIC) is commonly used, where the photodetector and ROIC are made on different materials, then bonded.

In order to achieve dual mode functionality within a pixel, such as classic frame rate imaging and high frequency events, advanced APS or ROIC designs must be implemented. One such design is described in U.S. Pat. No. 6,864,965 wherein a switching control allows either high resolution readout at low frame rate or readout of reduced resolution at high frame rates.

Another such apparatus is described in U.S. Publication [US 20120261553 A1] wherein an ROIC is provided which allows for switching between different detection modes. One of the disclosed modes allows for detection of a thermal image and detection of a short laser pulse in a commonly shared readout path. This mode enables capture of a passive image and location of laser events as every frame is readout. This application relates to another approach.

SUMMARY OF THE DISCLOSURE

The present disclosure is directed to imaging devices. In one aspect, an imaging device in accordance with the present disclosure comprises of a pixelated array of semiconductor detector elements, in which each detecting element is electrically connected to an integrated circuit, the integrated circuit comprising of a passive signal path, an active signal path and profile path. The passive path provides consecutive frame imaging, the active path detects the location of high energy events, and the profile path allows high rate readout of energetic events. The device further comprising a readout decoder block, the readout decoder block controlling operation of the passive paths. The device also comprises of an address arbitration control block, the address arbitration control block controls operation of the active paths, wherein the address arbitration control block readout of the active paths is independent of readout of the passive paths. Last, the device comprises of a profile decoder block, the profile decoder block controlling operation of the profile path, wherein the profile control block readout of the profile path is independent of the readout of the other paths.

BRIEF DESCRIPTION OF THE DRAWINGS

The accompanying drawings, which are incorporated in and constitute a part of the specification, illustrate preferred embodiments of the present disclosure. The drawings together with the general description given above and the detailed description of preferred methods and embodiment given below, serve to explain principles of the present disclosure.

DETAILED DESCRIPTION OF THE DISCLOSURE

Figure 1:
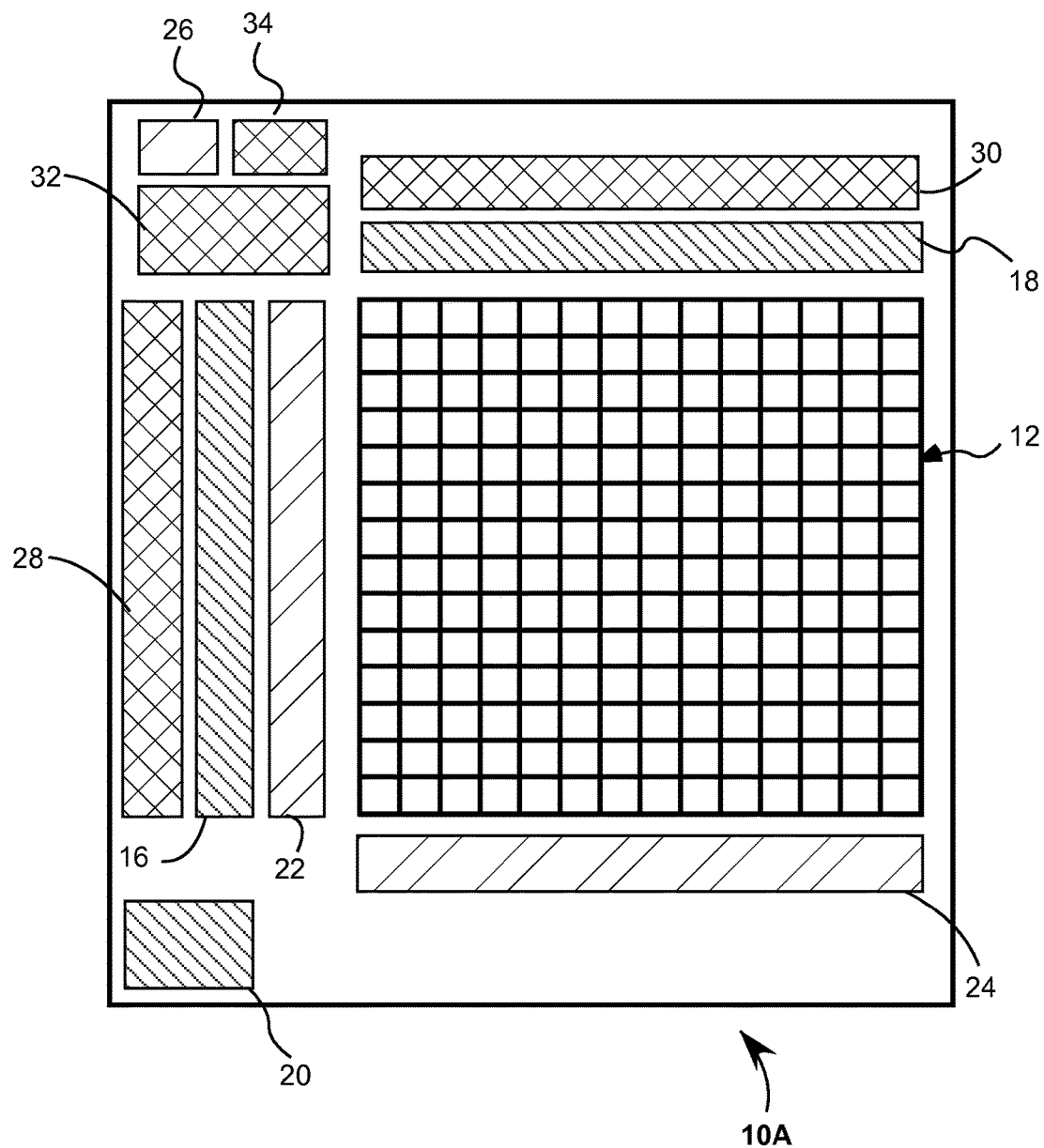
FIG. 1 is a plan view, schematically illustrating a imaging device, the device comprising a pixelated array of semiconductor detector elements, in which each detecting element is electrically connected to an integrated circuit, the integrated circuit comprising an passive signal path, an active signal path and a profile path, a readout decoder block, the readout decoder block controlling operation of the passive paths, and an address arbitration control block, the address arbitration control block controlling operation of the active paths, wherein the address arbitration control block operates independent of the readout of the passive paths, and a profile decoder block, the profile decoder block controlling operation of the profile paths, wherein the paths independently from other paths.

Referring now to the drawings, wherein like components are designated by like reference numerals. Methods and embodiments of the present disclosure are described further hereinbelow.

FIG. 1 schematically illustrates an imaging device 10A. Device 10A comprises of a pixelated array 12. Each pixel of the pixelated array is individually electrically connected to an integrated circuit. The integrated circuit comprises of a passive, an active, and a profile path. The passive path, active path, and the profile path each have dedicated readout allowing simultaneous passive imaging, active high energy event detection, and fast profile readout in a region-of-interest. The paths are operate independently in that the active path has detection that is asynchronous in relation to the passive channel and the profile path has frame readout times asynchronous with the start and duration of the passive path frame readout, all the paths readout independent from another.

The passive path is operated by a readout decoder block. The readout decoder block comprises of a vertical passive decoder 16, a horizontal decoder 18, and a passive timing generator 20, each designated by similar hatching. The passive path allows classic imaging frame rates.

The active path is operated by the address arbitration control block. The address arbitration control block comprises of a vertical arbitrator 22, a horizontal arbitrator 24, and an event address block 26, wherein the components comprising the address arbitration control block are designated by similar hatching. The active path detects high energy events and provides address information of the pixels detecting the events. The high energy events are those created by transient emission of electromagnetic radiation. Nonlimiting high energy events include munitions fire, explosive detonation, propellant, other such forces releasing exothermic energy, and release of optical energy from electromagnetic sources, such as a laser.

The profile path is operated by the profile decoder block. The profile decoder block comprises of a vertical profile decoder 28, a horizontal profile decoder 30, and a profile timing generator 32. The profile path reads out the signal from pixels in a region-of-interest, the region-of-interest located about pixels detecting high energy events. The profile path reads out the signals from the pixels in the region-of-interest at a much faster frame rate than the passive path. The readout frequency of the region-of-interest depends on the size of the region-of-interest. For instance, with clocking signals in the megahertz (MHz), frequency range, a 16×16 region of interest can be readout at kilohertz (kHz) frame rates. A typical readout of 20 MHz, results in a region-of-interest frame rate of about 78 kHz. Basic operation of the device is described below.

During operation the passive path is continually providing scene data in classic image frame rates. The passive path is operated similar to other progressive scan cameras with clocked signals that allow frame rate frequencies nominally at 60 hertz (Hz) or frames per second (fps). If a high energy event, such as those aforementioned, is imaged onto a pixel or pixels, the event will quickly be detected via the active path. The active path is designed to quickly detect fast rising edges corresponding with high energy events. The active path provides address information of the pixel, not amplitude information, although the amplitude of the threshold used for event detection can be set with user programmable inputs. Based on the event address, the profile path begins readout of the pixels that surround the spatial address of the event. The profile path reads out the region-of-interest in kilohertz frequencies and faster. The profile path operates at high frame rates such that the temporal amplitude profile of the high energy events is provided. The profile path also does not require integration, and the signal is logarithmically compressed so that saturation is unlikely, whereas the passive path may saturate during high energy events. The pixel array and integrated circuit are discussed in detail further hereinbelow.

Pixelated array 12 is made from a photosensitive semiconductor material referred herein as photodetector material. The photodetector can be made from any photosensitive semiconductor material which can be pixelated, non-limiting examples include germanium (Ge), indium gallium arsenide (InGaAs), indium antimonide (InSb), Silicon, Galium Arenside (GaAs), Silicon Carbide (SiC), mercury cadmium telluride (HgCdTe), III-V strained layer super lattice (SLS) structures, structures using barrier detector technologies (nBn), and crystalline variations of those aforementioned. Each semiconductor type has spectral response which allows detection at various spectral bands. Some preferred spectral response is in the infrared so as to detect exothermic events. Other preferred spectral response include spectral bands used for laser ranging, designation, or communication. Spectral response of the photodetector materials can be extended or modified by implementation coating and scintillators. Coating include antireflection coating, reflection coating, bandpass, bandstop, shortpass, longpass, notch, and other such spectral filtering and combinations thereof. Scintillators allow up-converting or down-converting of otherwise undetectable wavelengths to wavelengths detectable to the particular photodetector material.

Other methods to increase spectral performance of the device, in addition to the aforementioned material types, coating, and scintillators, is based on the material thickness. The thickness of the photodetector material will have an effect on the spectral range of the imaging device based on the photodetector absorption length. Back thinning or wafer removal techniques allow for increased spectral response for materials which have a short absorption length in the desired spectral range. Alternatively, thick substrates are desirable when the absorption length of the photodetector material is long.

One preferred photodetector material is indium antimonide (InSb) with spectral sensitivity from about 1 microns (μm) to about 6 microns. Another preferred material is mercury cadmium telluride (HgCdTe) which has spectral sensitivity from about 0.5 microns to about 15 microns. Both InSb and HgCdTe must be cooled with, for instance, liquid nitrogen or a mechanical cooler. Utilizing either material allows passive imaging in the infrared region and detection of exothermic energy from small arms, explosive detonations, and other such high energy events which emit electromagnetic radiation in the infrared.

When the photodetector material is made from ultraviolet, near-infrared, or infrared sensitive semiconductor material, other than silicon, a separate readout integrated circuit (ROIC) must be manufactured and attached to the pixel array using such methods as solder bump bond hybridization. If the photodetector material is silicon, then the circuit can be integrated within the silicon, referred generally as active pixel sensors (APS), although silicon based devices can also use a separate integrated circuit. The ROIC or the APS can be manufactured with well-known silicon based photolithography techniques such as those developed in CMOS technology.

Figure 2:
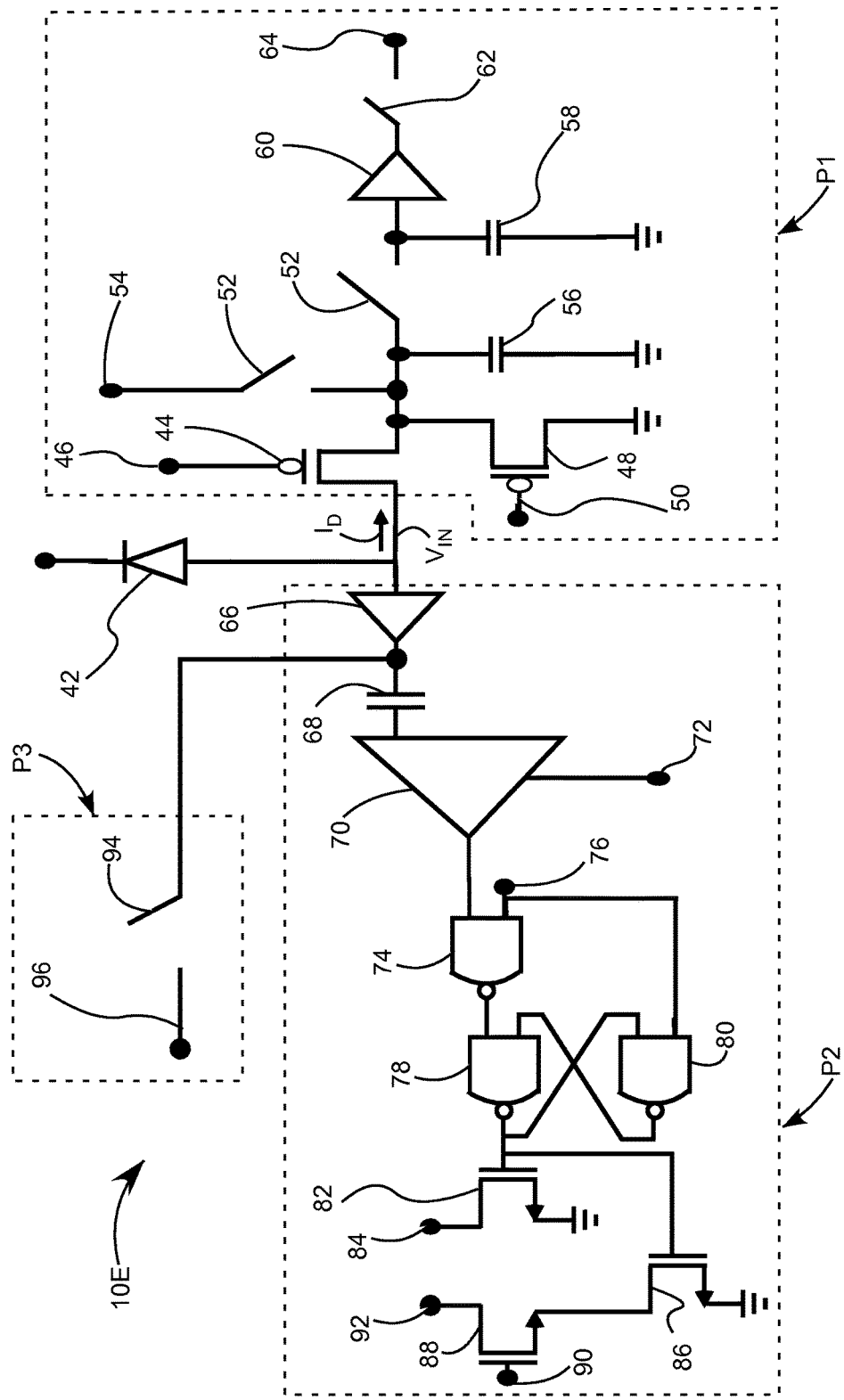
FIG. 2 is an electrical diagram of the integrated circuit of a pixel in the pixel array.

FIG. 2 is an electrical diagram of an integrated circuitry 10E of the present disclosure. Here, one of the photosensitive pixels in the pixel array is represented by a photodiode 42. Integrated circuitry 10E has a passive path circuitry P1, an active path circuitry P2, and a profile path P3. By way of example, during operation, photodiode 42 is illuminated and provides current flowing through passive path P1. The direct current and slow current changes are detected by the passive path and fast current changes are detected by the active path. If a fast current change is detected by the active path, then the profile decoder block will begin operation of the profile path and readout the region-of-interest defined based on the event address.

The passive path provides the imaging device with the aforementioned classic frames rate image. Here the passive path is a direct injection type. Passive path P1 has a transistor 44 and a DC anode bias 46. Current flowing through transistor 44 causes charge accumulation, or integration, on a capacitor 58 when a switch 52 is closed. The integrated charge is then readout through a buffer 60 to a column wire 64 when a row select switch 62 is closed via clocking signals from the vertical passive decoder.

Here, the readout routine is standard raster scan readout of the passive path, as will be described operationally further hereinbelow. Likewise either integrate then read (ITR) or integrate while read (IWR) routines can be implemented with modification. An optional capacitor 56 allows charge accumulation for charge integration while switch 52 is open and the signal is being read out. Optional an anti-blooming transistor 48 has a DC bias 50 such that saturating charge accumulation is drained, thereby preventing blooming overflow to adjacent pixels. After readout of the signal, reset switch 52 is closed allowing DC or a ground bias 54 to be applied the capacitors and reset for another integration.

Anode voltage VIN at the anode is logarithmically compressed due to the direct injection type circuit. The logarithmically compressed voltage can be approximated using the following equation:

$$V_{IN} = V_{BIAS} + \frac{nkT}{q}\ln\left[\left(\frac{I_D}{I_{DO}}\right)\left(\frac{L}{W}\right)\right]$$

Where, $V_{BIAS}$ is the bias voltage on transistor 46, n is a capacitor ratio, k is Boltzmann's constant, T is the junction temperature in Kelvin, q is the electron charge, $I_{DO}$ is a process-dependent parameter related to leakage current during weak inversion, and L/W is the length over width ratio of the device in the direct injection type circuit.

Active path P2 has unity gain buffer 66, the unity gain buffer isolating the pixel anode from the active path. As previously described the voltage on the anode of the photodiode is logarithmically compressed. The logarithmically compressed voltage is fed to a discriminator 70 through the unity gain buffer and a calibration capacitor 68. Discriminator 70 is calibrated, the calibration initiated with via off-chip signal via an input 72, by configuring the discriminator in unity gain and storing the voltage offset of the comparator, an anode voltage VIN, and any accompanying background signal. Calibration is performed intermittently, the timing of the calibration based on the timing of events expected to be observed. Each pixel is calibrated based on in-pixel signals, the calibration stored on the respective calibration capacitor of each pixel, thereby requiring no off-chip computational burden. Calibration can be performed on asynchronously on individual pixels, rows, columns or sub-sections or all the pixels of the entire array can be calibrated simultaneously. Likewise, calibration of the active path can be timed in-sync with or asynchronous from the passive path operation After calibration discriminator 70 is configured as a high-gain discriminator. Discriminator 70 has a trigger voltage threshold, the threshold set according to expected pulse event strength and calibration of the system. The voltage threshold is preferably above the noise floor, thereby preventing false triggers, and low enough to trigger when high energy events are imaged on photodiode 42. Discriminator 70 has input 72 to calibrate and reset the discriminator. If the threshold is met a digital output from the discriminator is provided to latch circuitry. The trigger threshold, frequency of calibration, or combinations thereof can provide for filtering events with regard to signal or frequency. For instance, only high energy events can be detected by increasing the threshold sufficiently. Events can be temporally filtered by calibrating often, and adjusting the threshold sufficiently high to avoid triggering slower energetic events. Likewise, slower events can detected by performing calibration less frequently and lowering the threshold trigger.

The latch circuitry receives the digital output from the discriminator and latches to indicate a high energy event. The latch circuitry has a NAND gate 74 with output to a NAND gate 78. NAND gate 78 and NAND gate 80 are configured in a cross-coupled configuration resulting in a set-reset latch operation. A reset signal 76 is provided by the column arbitration and provides a signal to both NAND gate 74 and NAND gate 80, allowing reset of the latch circuit, independent of the discriminator output. When a high energy event occurs the latch circuit holds thereby flagging the digital flag readout logic circuit, which in turn indicates readout request of the address arbitration control block.

The digital flag readout logic circuitry has a row request 84 and a column request 92. Row request 84, an open drain circuit, is flagged by closing a transistor logic 82. Column request 92, another open drain circuit, is flagged by closing a transistor logic 88 and a transistor logic 86. The hold signal from the latch closes transistor logic 82 thereby flagging column request 84. When the row arbitration decoder sees the flagged row request it performs a row read 90 which closes transistor logic 88, thereby flagging for a column flag readout. After the row and column readout the location, or address, of the pixel is known.

Once the address of a high energy event is known the profile readout block begins operation of profile path P3. The profile path begins readout in the region-of-interest surrounding the high energy event address. A controller provides the start and end addresses of the region-of-interest to be readout. The profile path is read out with clocking signals, similar to the passive path, except readout is at much higher speed in the profile path. The passive path reads out the logarithmically compressed signal from the photodiode through the unity gain buffer 66. Passive path P3 has a row select switch 94 which allows readout of the signal via a column wire 96. During raster readout of the pixels in the region-of-interest the row select switch is closed and then each column is sequentially addressed to readout to the horizontal profile decoder.

In summary, the combination of the passive, active and profile path allows simultaneous imaging, high energy event detection, and fast profile readout of energetic events. The passive paths are readout in a row then column fashion, creating a raster image of the scene at the readout, while the active path asynchronously detects high energy events and provides a path separate from the passive signal path, in which the scene information can be readout asynchronous with respect to the start and stop of the video rate integration time of the passive signal channel. The signals in the profile path of the pixels in a region-of-interest (ROI) about the pixel or pixels that detected the high energy events are readout at high frame rate, which is programmable, through a readout amplification chain that is separate from the passive and active signal path. The start of the high rate ROI readout of the profile signal path can occur at any time, irrespective of the state of the passive signal path, the duration of the high rate ROI readout can continue beyond the end of one or more passive signal frame integration times, and the stop of the ROI can occur irrespective of the state of the passive signal path. With collection of the data readout from the passive and profile signal channels, the passive signal image and profile information can be overlaid on a display or otherwise logically correspond in output data.

Figure 3:
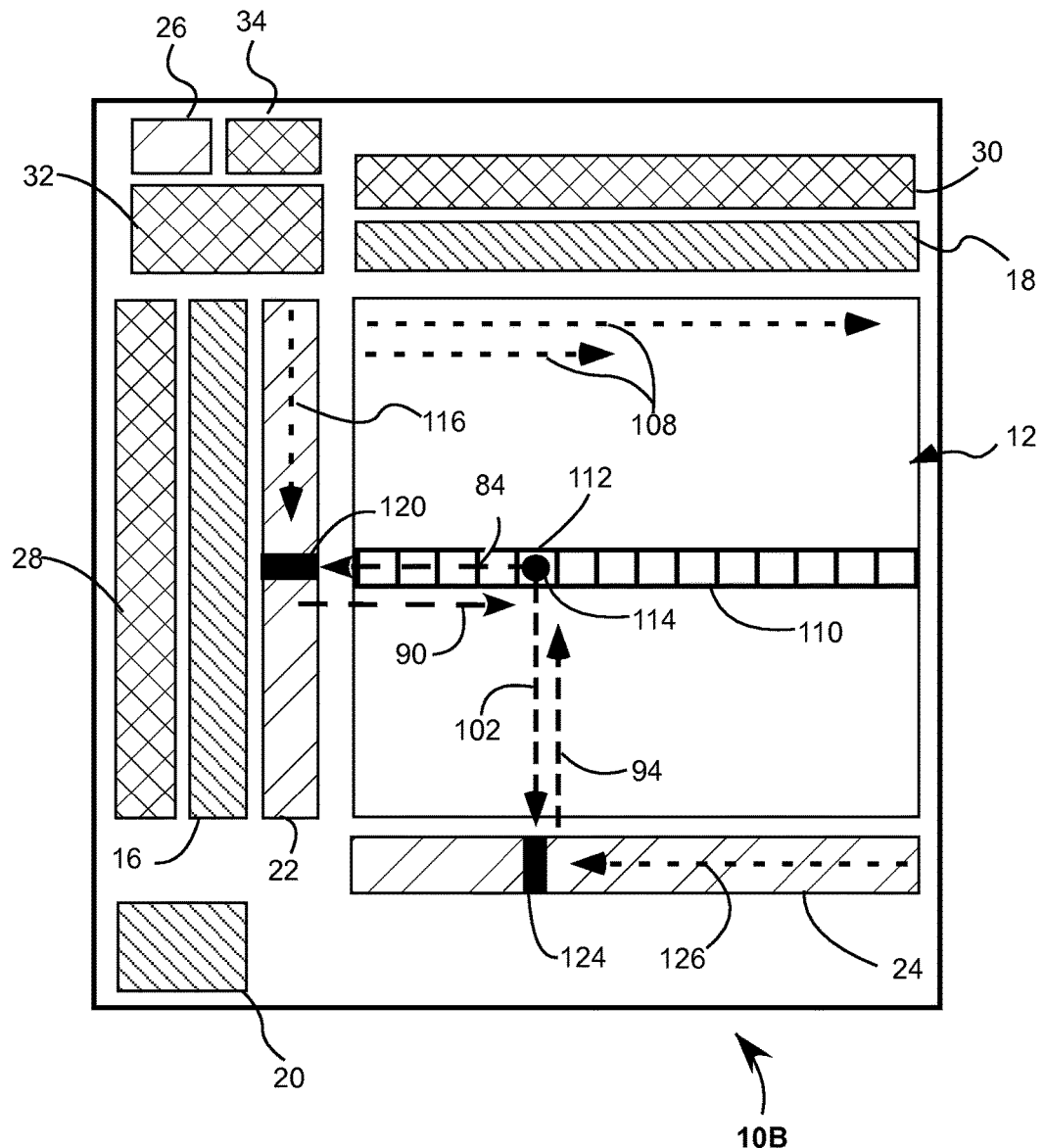
FIG. 3 is a plan view of the dual mode imaging device as that seen in FIG. 1, wherein address arbitration is exemplified.

FIG. 3 is a plan view of an imaging device 10B wherein a single row is illustrated for purposes of explaining the passive, active path readout. During operation vertical passive decoder 16 and horizontal passive 18 read out rows of pixels in a raster pattern 108. Timing of the raster readout is clocked by activating a row, then sequentially activating the column, reading each pixel individually. While the vertical passive decoder and horizontal passive decoder are reading out the passive signals, or the pixel is integrating, the active path row arbitrator is awaiting a flagged row request. At any point during passive integration or readout, a high energy event will cause a row request in the active path. Here, an exemplary pixel 112 in a row 110 is shown with an incident event 114. As described above, pixel 112 will flag row request 84 causing a token 116 to be generated. Alternatively, the row arbitration can be cyclically sequenced. Token 116 continuously advances through vertical arbitrator 22 until the token reaches a flagged row 120. After a valid row address is found the row address is readout. The row arbitration then selects the row for readout using row flag read signal 90. The row read signal will enable column request 92 with column request, activating horizontal arbitrator 24. Horizontal arbitrator 24 creates a token 126 which advances through the columns until flagged column 124 is found and readout. After the address is found and validated the flag is reset to enable the pixel to detect another high energy event. If for instance if the high energy event spanned multiple pixels, each pixel address would be sequentially readout.

The active path arbitrators advance at a rate of about a couple hundred picoseconds per row or column. The timing jitter depends on the scan time of the device, which in turn depends on the pixel array size. If only one pixel is flagged in a 640 by 512 array the maximum time to scan the array and locate the flag is about 230 ns. Determination of arrival time can be compensated by the location of the signaling pixel because the digital arbitration can be deterministic. For instance if tokens are always sent from one end of the row, or the column, then uncertainty in the arrival time can be adjusted based on the location of the pixel from the end of the column, or the row, allowing for calibrated time stamps. In addition to spatial compensation, various tree and hierarchical decoder and arbitration configurations can also increase readout speed and accuracy as is known in the art. In practice the rate of the address arbitration control block can be slower, dependent on the application. For instance, a milliseconds is adequate in some applications in which high energy events occur over several milliseconds, such as explosive events.

Figure 4:
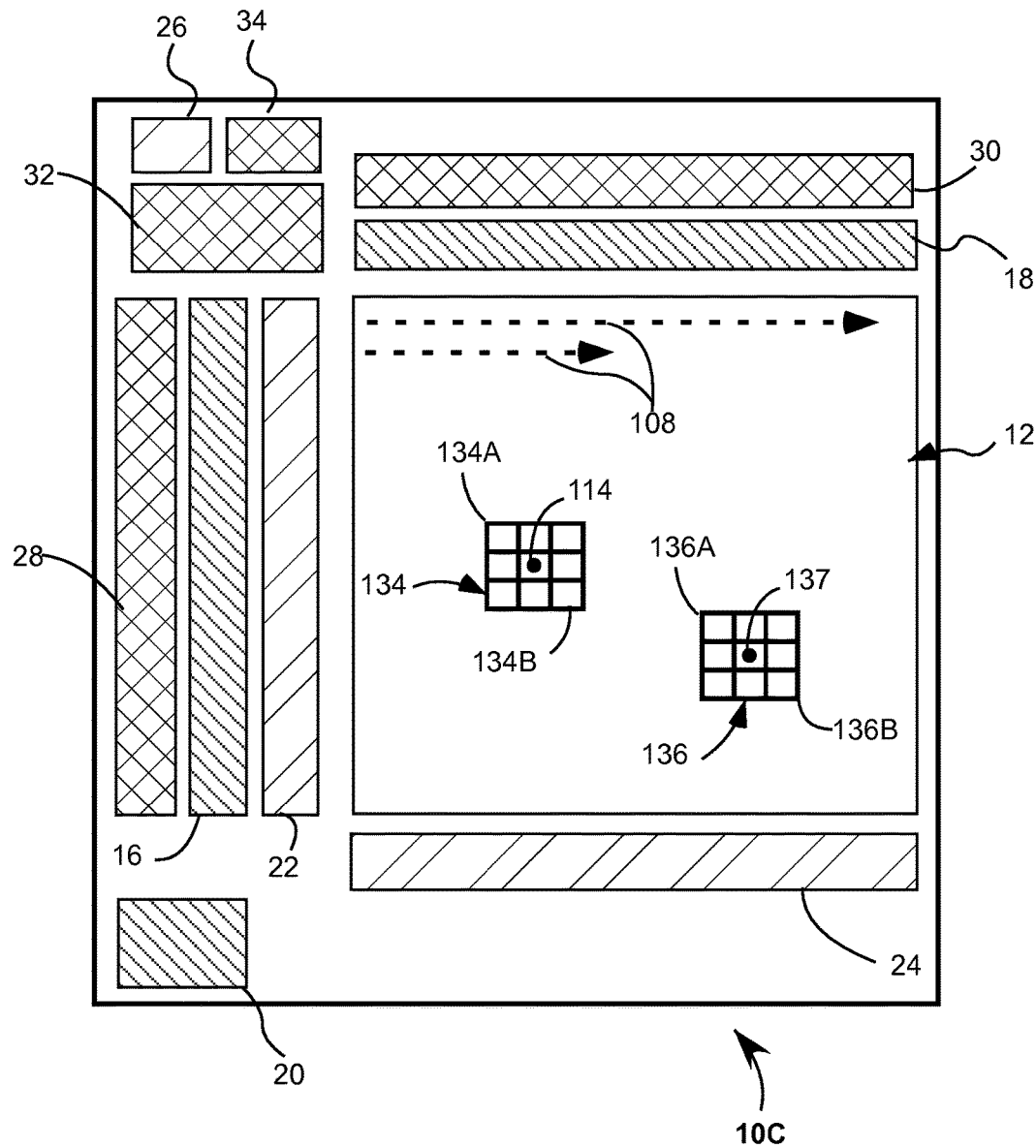
FIG. 4 is a plan view of the imaging device wherein a profile path region-of-interest readout is exemplified.

FIG. 4 illustrates a device 10C. Device 10C exemplifies operation of the profile readout. As shown in FIG. 3, the address arbitration control block finds and provides the address of event 114. To quickly establish a region-of-interest the profile decoder block can have preset boundaries such as 16 row and column boundaries, a preset region based on a single pixel row and column, or start and stop pixels that define the region. Less refined ROI boundaries also simplifies the design and minimizes the complexity of the digital logic. If a large number of events are detected in the active path, a region of interest can be placed based on the centroid or otherwise encompass the event detecting pixels. Spatial and temporal filtering of the event data or other processing may be used to determine the placement of the ROI, the start of the high speed readout, and the readout frame rate. Once the address is known, the profile decoder block will begin readout of a region of interest 134. Here, region-of-interest 134 is defined by start pixel 134A and stop pixel 134B. The readout of the profile path is performed in a raster pattern similar to the passive path and operates at an analog output data rate proportional to the ROI size and frame rate. Here a 3×3 region-of-interest is shown, but in practice larger areas are read out.

While the profile path is being readout, the readout decoder block continues to operate and raster the entire array. The address arbitration control block can also operates the active paths of pixels, other than those reading out the profile path, enabling detection of another transient event in the field of view of the device. For instance if another event 137 is detected, the profile decoder block would begin readout of another region-of-interest 136, defined by a start pixel 136A and a stop pixel 136B. While the paths can all be operating independently, and readout independently, the active path can be optionally disabled for pixels which are reading out profile path signals. Operation of the active path while reading out the profile path may provide undesired noise to the profile path during active path reset.

Figure 5:
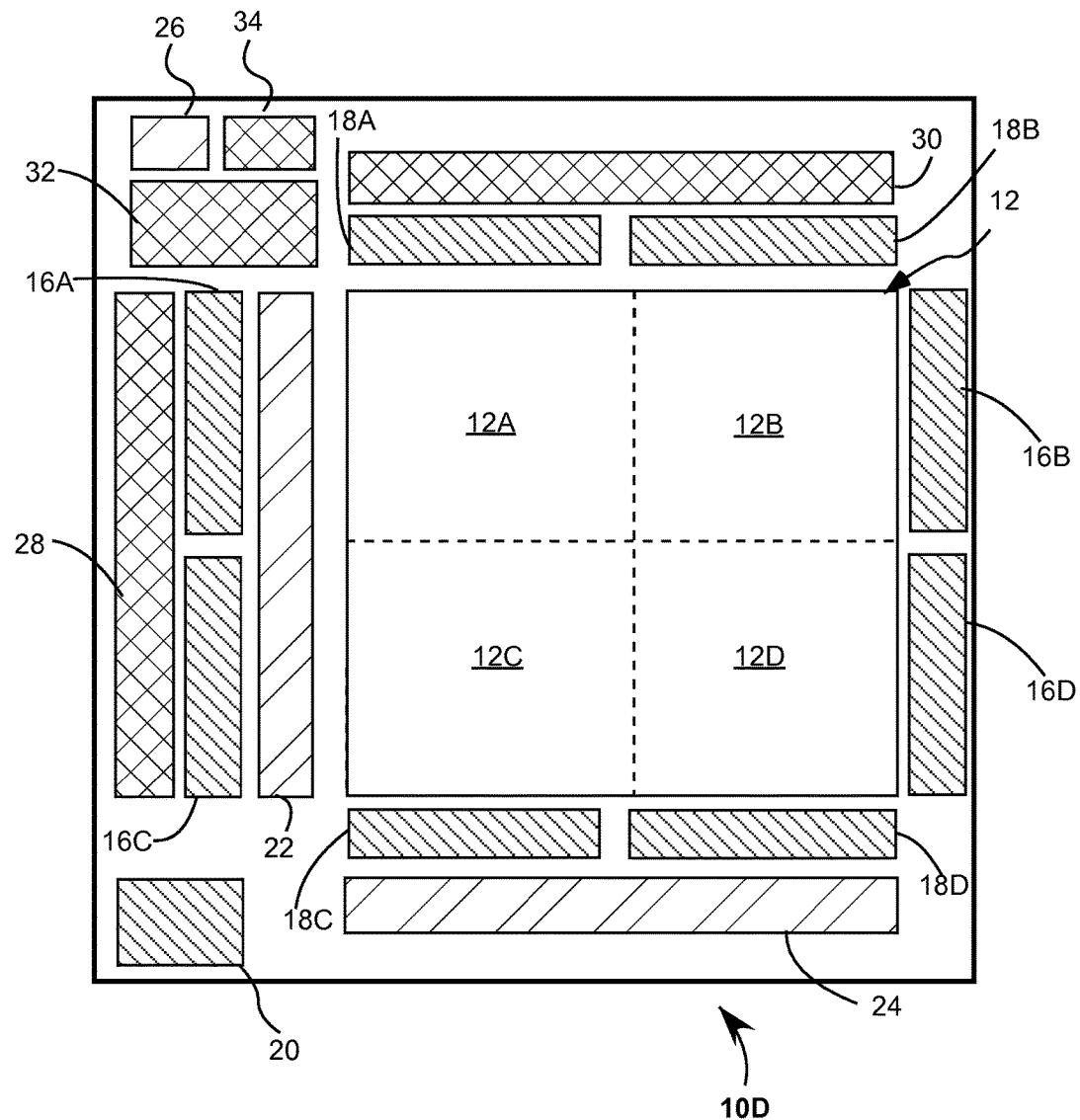
FIG. 5 is a plan view of the imaging device wherein the passive decoder block comprises of a plurality of sub-decoders.

FIG. 5 is a plan view illustrating a device 10D, an example of different decoder configurations of the present disclosure. Device 10D is similar to the device as that shown in FIG. 1, except here, vertical passive decoder 16 and horizontal passive decoder 18 each comprise of a plurality of sub-decoders. Here, vertical passive decoder 16 comprises of a sub-decoder 16A, 16B, 16C, and 16D. Vertical passive decoder 18 comprises of a sub-decoder 18A, 18B, 18C, and 18D. Pixel array 12 is subdivided into four areas 12A, 12B, 12C, and 12D. Horizontal passive sub-decoder 16A and vertical sub-decoder 18A service pixel area 12A. Row sub-decoder 18B and column sub-decoder 16B service pixel area 12B. Row sub-decoder 18C and column sub-decoder 16C service pixel area 12C. Row sub-decoder 18D and column sub-decoder 16D service pixel area 12D. Operation of each pixel area is substantially the same as described above within each pixel area. In the current configuration, subdividing the decoders allows for a reduced readout area of about 25% and therefore a decrease time associated with scanning the entire area. The particular configuration, wherein each row and column arbitrator is located next to their serviced pixel area, allows the shortest electrical path from pixel area to decoders. Each of the pixel areas can be readout asynchronous from another. Such a configurations can be advantageous when faster passive imaging is needed.

Similarly, the profile decoders or active arbitrators can be subdivided for increased readout speed of the entire array or different regions of interest. As the passive and profile decoder is clocked, the readout can increase in speed about the same ratio as the area is decreased, but is only advantageous for the profile path when the region-of-interest are in different pixel areas. Sub dividing the arbitrators allows for fast event detection when multiple high energy events occur on different areas of the pixelated array.

Each of the profiles have unique temporal characteristics and signal strengths. The high energy events will normally saturate devices with normal frame rates and circuitry as that disclosed in the passive path. In addition, the integration times in such devices are too long, and thus have insufficient temporal resolution to capture the intensity profiles of the high energy events, as described below.

Figure 6A:
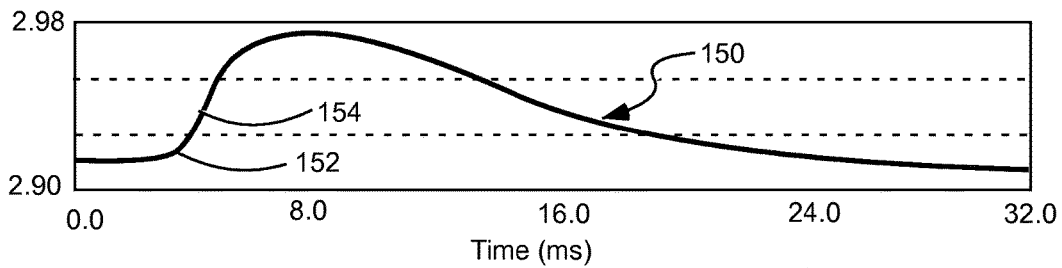
FIG. 6A is a graph illustrating the voltage profile of the anode of the pixel detecting a high energy event.
Figure 6B:
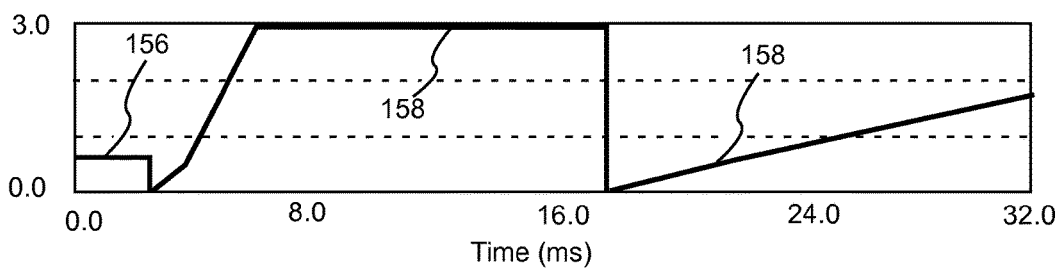
FIG. 6B is a graph illustrating the passive path readout of the event described in FIG. 6A.
Figure 6C:
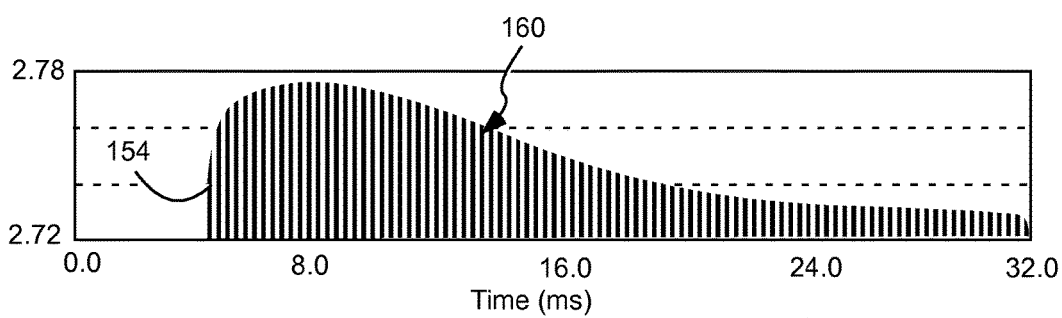
FIG. 6C is a graph illustrating the profile path readout of the event described in FIG. 6A.

FIG. 6A, FIG. 6B, and FIG. 6C are graphs demonstrating the differences between the passive path and profile path.

FIG. 6A is of a graph G2, which shows a logarithmically compressed anode voltage 150 resulting from the current generated at photodiode caused by a high energy event such as an explosion. The logarithmic signal voltage profile 150 has a knee 152 which corresponds with an explosion. After the explosion the voltage profile has a fast rising edge 154, peaks in few milliseconds and then trails off over about 10 milliseconds.

FIG. 6B is of a graph G3 which shows the high energy explosive event as seen by the passive path. Before the event occurs, a passive frame 156 is readout and the passive path is reset. A frame 158 integrates the signal, then the event occurs and due to the energy from the event, the photosignal causes the pixel circuits to saturate. Upon readout, about 16.6 milliseconds after starting integration, the passive path in the pixel is reset. A frame 159 then integrates the trail of the explosive signal. The saturation of the amplifier and the synchronous reset of the passive path of the pixel causes a nonlinear response of the pixel with respect to the amplitude and time of the energetic events shown in graph G2.

FIG. 6C is of a graph G4 which shows the high energy event as readout by the profile path. A profile readout 160 of the logarithmically compressed voltage 150, of FIG. 6A, starts shortly after the location of the high energy event is provided from the active path of one or more pixels in the ROI, or correlated to the location of the ROI. The periodicity of the profile readout 160 is representative of the periodic times of the readout of each pixel path, the signal reset baseline, until the pixel profile signal is readout again during the next ROI frame. The column spacing is for illustrative purposes only, as the profile readout is capable of variable readout speeds, ranging from below video rates up to millions for ROI frames per second, depending on the size of the ROI, the speed of the horizontal, vertical readout clocks used to address the pixels of the ROI, and the maximum bandwidth of the amplifier or amplifiers used to readout the ROI.

The disclosed device is capable of simultaneous passive imaging, detection of high energy events, and high rate readout the signal from high energy events. By detecting the temporal profile of each pixel in the region-of-interest, the device detects the expansion, contraction, and movement of the high energy events move across the pixelated array, generally capturing the evolution of the high energy event. Based on the evolution of the high energy event, the region-of-interest can be increase or decrease in area or can be moved across the array, such as might occur if a missile were fired and its flight path traversed a portion of the field of view of the imager. Supplied with a database or library of such profiles and movement characteristics, the device enables identification and characteristics of high energy events.

The disclosed imaging device has a variety of useful application. In general it can be used in any application in which normal frame rate image is needed and high energy events must be located, profiled and/or identified. The device useful for military, police, general security, fire monitoring and control, manufacturing, scientific applications. Military and police applications include gunshot detection, identification, and location. Likewise, general security applications include monitoring high risk areas such as airports. Commercial aircraft may use it for detecting, identifying and locating missile, mortar, rocket attacks, such as from terrorist activity. The device can be implemented for incendiary and explosion monitoring and identification in industrial applications such as mining and oil extraction operations. Likewise the device is generally applicable in scientific use for monitoring high energy events.

The device can be functionalized for specific modes with implementation of a controller. The controller is on-chip logic which can be integrated within the device circuitry, and can be part of or include the aforementioned logic in the controls blocks. The controller can be characterized as a digital integrated circuit, microprocessor, microcontroller, processor, or digital signal processor. The controller can be pre-programmed or field programmable. The controller can change integration time of the passive pixels, disable pixels, and disable certain path circuitry within pixels. Likewise the controller can access the output data and match to the aforementioned database for event identification, which can be stored in local memory, and updated with new threats, as they are available.

Integration time of the pixels can be stopped early or started later for shortened integration times. This technique can be useful when imaging through semi-transparent media and obscurations. For instance obscurations such as rain, clouds, fog, smoke, dust, and certain glasses can saturate the passive imager during integration periods. Illuminating the area with wavelengths transparent or semi-transparent to such obscurations, yet still detectable by the photodetector material, allow imaging through the obscurations. By shortening the integration time, less of the unwanted background noise from the obscurations will be detected and with sufficient illumination, objects and scene data imagery can be obtained.

Additional techniques to increase and ensure reliable performance of the device is reduction of false alarms in the event detection paths. Pixels that are noisy can provide false triggers of the active path and thus undesired and wasteful readout by the profile path. One method to reduce false triggers is implementing pixel disable logic. Pixel disable logic allows the active event detection signal path to be disabled. Similarly, the profile path, the passive signal path, or any combination of the three signal paths may be disabled. All three signal paths may be disabled by switching off the power to the pixel. When the passive signal path is disable, averaging of spatially adjacent pixels can be used to replace lost signals from the disabled pixels.

From the description of the present disclosure provided herein one skilled in the art can design the imaging devices in accordance with the present disclosure. For instance one skilled in the art could use SPICE software to simulate and verify designed circuitry. Other design software and chip layout with software is available from a variety of suppliers such as Cadence Design Systems, Tanner EDA, Silvaco, Inc., Synopsys, Inc., and Mentor Graphics Corp. Coordination of design and fabrication can be accomplished at any commercial semiconductor integrated circuit fab, integrated device manufacturers, or pure-play semiconductor foundries.

While the present disclosure has been described in terms of particular photodetector materials, circuitry, and operational logic, others can be implemented without departing from the disclosure. In summary, the present disclosure is described above in terms of particular embodiments. The disclosure, however, is not limited to the embodiments described and depicted herein. Rather, the disclosure is limited only by the claims appended hereto.

What is claimed is:

1. A dual mode electro-optical radiation imaging device, the device comprising:
a pixelated array of semiconductor detector elements, in which each detecting element is electrically connected to an integrated circuit, the integrated circuit comprising an passive signal path, an active signal path and a profile path;
a readout decoder block, the readout decoder block controlling operation of the passive paths;
an address arbitration control block, the address arbitration control block controlling operation of the active paths;
a profile decoder block, the profile decoder block controlling operation of the profile paths; and
wherein readout of the passive path, active path, and profile path operates independently.

2. The device of claim 1, wherein the pixelated array is made from indium antimonide (InSb), mercury cadmium telluride (HgCdTe), or any other III-V or II-IV material sensitive to thermal infrared energy, within the spectral band of about 1 micron to about 15 microns.

3. The device of claim 1, wherein the pixelated array is made from InGaAs, Ge, SiGe, or other material sensitive within the non-visible near-infrared and reflected infrared portion of the spectrum from about 4 microns to about 7 microns wavelength.

4. The device of claim 1, wherein the pixelated array is made from silicon carbide (SiC), silicon (Si), gallium arsenide (GaAs) or other detector materials sensitive in the ultraviolet or visible portion of the optical spectrum from about 0.2 microns to about 1.1 microns.

5. The device of claim 1, wherein the profile decoder block reads out a region-of-interest.

6. The device of claim 5, wherein the region-of-interest moves with the projected movement of a high energy event imaged on the pixelated array.

7. The device of claim 1, wherein the device circuits and detector elements are made within the same substrate.

8. The device of claim 1, wherein the pixelated array is thinned to less than 500 microns thickness and optical radiation enters the device from the opposite side containing circuits.

9. The device of claim 1, wherein the device provides gain to the optical signal through an impact ionization process within the detector material.

10. The device of claim 1, wherein the circuits of the device are fabricated using CMOS processing.

11. The device of claim 1, wherein the active path detection threshold level is fixed.

12. The device of claim 1, wherein the address arbitration control block outputs the address representing the centroid of a group of adjacent pixels detecting events.

13. The device of claim 1, wherein the gain-bandwidth properties of the passive signal paths is adjustable, individually or in aggregate.

14. The device of claim 1, wherein the readout decoder block is comprised of a plurality of independent asynchronous sub-decoders electrically connected to different portions of the pixel array for the purpose of reducing the time required to readout.

15. The device of claim 1, wherein the address arbitration control block reads out active path signals based on a multi-level hierarchy of processing elements such that processing of signals occurs faster.

16. The device of claim 1, wherein the profile decoder block is comprised of plurality of sub-decoders, the sub-decoders electrically connected to the passive paths of the pixels of a separate sub-section of the pixel array, the sub-decoders reading out through separate outputs from the other sub-sections of the array such that time required to readout different regions-of-interest is decreased.

17. The device of claim 1, wherein the operation of the address arbitration control block is initiated by detection of an event in the active channel of a pixel or pixels in the array.

18. The device of claim 1, wherein operation of the arbitration control block includes continually sequenced arbitrators while the device is imaging.

19. The device of claim 1, wherein the detector is sensitive to electromagnetic radiation regions from the group consisting of ultraviolet, visible, near-infrared, short infrared, mid-infrared, long infrared, or combinations thereof including lasers emitting in those regions.

20. The device of claim 1, wherein the imaging device further comprises a processor or controller.

21. The device of claim 20, wherein the controller is used to disable the passive path circuitry of a pixel.

22. The device of claim 20, wherein the controller is used to disable the active path circuitry of a pixel.

23. The device of claim 20, wherein the controller uses data from the profile path to match and identify high energy events in a corresponding profile library.

24. The device of claim 20, wherein the controller processes information from the address arbitration control block to determine the position of objects in the field of view reflecting or emitting pulsed electro-optical energy.

25. The device of claim 20, wherein the controller is equipped with a countermeasure to the identified threat.

26. The device of claim 20, wherein the data from both the passive paths and the profile paths are used to track a target emitting or reflecting electro-optical radiation.

27. The device of claim 20, wherein one or more pixel elements are readout from the passive path signal based on the address of events detected in the address arbitration control.

28. The device of claim 20, where in the controller allows a plurality of programmable operating modes, the modes determining the region-of-interest location and size.

29. The device of claim 20, wherein one or more symbols are superimposed at one or more addresses of the display of the passive path information, wherein the symbols represent the high energy event identification.

30. The device of claim 20, wherein one or more symbols are superimposed at one or more addresses of the display of the passive path information, wherein the symbols correspond to the trajectory of the high energy event.

* * * * *